(12) United States Patent
Wang et al.

(10) Patent No.: US 8,693,502 B2
(45) Date of Patent: Apr. 8, 2014

(54) METHOD, SYSTEM AND TERMINAL FOR ACCESSING PACKET DATA SERVING NODE

(75) Inventors: Xiaowei Wang, Guangdong Province (CN); Sheng Fang, Guangdong Province (CN); Ying Pan, Guangdong Province (CN); Xihua Chen, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 384 days.

(21) Appl. No.: 13/258,005

(22) PCT Filed: Dec. 4, 2009

(86) PCT No.: PCT/CN2009/075327
§ 371 (c)(1),
(2), (4) Date: Nov. 7, 2011

(87) PCT Pub. No.: WO2010/130128
PCT Pub. Date: Nov. 18, 2010

(65) Prior Publication Data
US 2012/0044920 A1    Feb. 23, 2012

(30) Foreign Application Priority Data

May 12, 2009    (CN) .......................... 2009 1 0084010

(51) Int. Cl.
*H04J 3/24*         (2006.01)
(52) U.S. Cl.
USPC ........................................................ 370/474
(58) Field of Classification Search
None
See application file for complete search history.

(56) References Cited

U.S. PATENT DOCUMENTS

| 7,366,136 | B1 | 4/2008 | Kalbag et al. |
| 2004/0008728 | A1* | 1/2004 | Lee ................................ 370/474 |

(Continued)

FOREIGN PATENT DOCUMENTS

| CN | 1479494 A | 3/2004 |
| CN | 1529446 A | 9/2004 |
| WO | 03079660 A1 | 9/2003 |
| WO | 2007103479 A2 | 9/2007 |

OTHER PUBLICATIONS

International Search Report for PCT/CN2009/075327 dated Feb. 22, 2010.

*Primary Examiner* — Chirag Shah
*Assistant Examiner* — Amar Persaud
(74) *Attorney, Agent, or Firm* — Ling Wu; Stephen Yang; Ling and Yang Intellectual Property (57) ABSTRACT

The present invention discloses a method, system and terminal for accessing a Packet Data Serving Node. Said method comprises: directly accessing a service server to register through a WIFI module; receiving returned parameter information; carrying out PPP encapsulation for request information for establishing the PPP link to generate a first data packet; encapsulating said first data packet with one layer of TUNNEL header to generate a second data packet; encapsulating said second data packet with one layer of IP header based on a WIFI link to generate a third data packet and sending said third data packet to a WAG through a WIFI link; said third data packet being used for analyzing and dropping the IP header and TUNNEL header of said third data packet to recover the first data packet after being received by WAG, and recovered first data packet is analyzed by PDSN to establish a link connection.

18 Claims, 7 Drawing Sheets

(56) References Cited

U.S. PATENT DOCUMENTS

| | | | |
|---|---|---|---|
| 2006/0046728 A1* | 3/2006 | Jung et al. | 455/445 |
| 2006/0146818 A1* | 7/2006 | Oouchi et al. | 370/389 |
| 2006/0171365 A1* | 8/2006 | Borella | 370/338 |
| 2006/0245408 A1* | 11/2006 | Lee et al. | 370/338 |
| 2007/0230413 A1 | 10/2007 | Gandhi et al. | |
| 2008/0101291 A1* | 5/2008 | Jiang et al. | 370/331 |
| 2009/0323658 A1* | 12/2009 | Balasubramanian et al. | 370/338 |

* cited by examiner

METHOD, SYSTEM AND TERMINAL FOR ACCESSING PACKET DATA SERVING NODE

TECHNICAL FIELD

The present invention mainly relates to the mobile internet accessing technical field, and particularly, to a method, system and terminal for accessing a packet data serving node (PDSN) through the WIFI.

BACKGROUND OF THE RELATED ART

In the mobile internet field, both of the 3rd Generation (3G) and the Wireless Local Area Network (WLAN) belong to the current technique hotspots. The 3G is a global roaming mobile communication network which is able to provide various types of high quality multimedia services, and the main technical standards include the Wideband Code Division Multiple Access (WCDMA), Code-Division Multiple Access 2000 (CDMA2000) and Time Division-Synchronous Code Division Multiple Access (TD-SCDMA), and the 3G mainly provides Internet services, private network access services, WAP/BREW/JAVA based services and multimedia communication services and so on.

The WLAN is able to provide high speed wireless access in a smaller area, and is used for transmitting Internet Protocol (IP) packet data packets. At present, the main technical standards include 802.11b, 802.11a and 802.11g, which are all based on the Carrier Sense Multiple Access with Collision Avoidance (CSMA/CA) technique, wherein 802.11b is currently the most widely applied domestic standard, which is also called the Wireless Fidelity (WIFI), and uses the 2.4 GHz band, and the maximum shared bandwidth is 11 Mbit/s. At present, the indoor coverage of the products can generally reach to 30-50 m, and the outdoor coverage can reach to 100-200 m.

In recent years, with the higher and higher demands for the wireless access speed, bandwidth and data services of users, the interworking services between the 3G network and the WLAN network attract wide attention. The 3rd Generation Partnership Project (3GPP) also takes the 3G/WLAN interworking system as an additional standard of the 3GPP. Since the coverage of the WIFI network is limited, and as for a terminal, besides the WIFI module, other wireless communication modules (Modem) should also exist.

The prior art at least has following drawbacks that: the terminal directly accessing the Internet by the WIFI is unable to access a plurality of services of the Public Data Network (PDN), however the available access bandwidth provided by the cellular mobile communication network is limited, and particularly for services such as the video on demand, video broadcast and so on with a higher requirement for bandwidth, with too many problems to be dealt with, and is unable to implement various data services of the existing PDN well.

SUMMARY OF THE INVENTION

The present invention presents a method, system and terminal for accessing a Packet Data Serving Node (PDSN) through a WIFI, and further establishes a Point-to-Point Protocol (PPP) link on the WIFI link, and the data packet interacting channel is the PPP link based on the WIFI link, thereby implementing various data services provided by the PDN.

The technical scheme of the present invention is implemented in this way:

The present invention presents a method for accessing a Packet Data Serving Node (PDSN), which comprises:

a terminal directly accessing a service server to register through a Wireless Fidelity (WIFI) module;

said terminal receiving parameter information returned from said service server after registering successfully;

said terminal starting a Point-to-Point Protocol (PPP) module, and carrying out PPP encapsulation for request information of establishing a PPP link to generate a first data packet encapsulating a PPP header;

said terminal starting a TUNNEL module, and according to said parameter information, further encapsulating said first data packet with one layer of TUNNEL header to generate a second data packet, wherein said PPP module and said TUNNEL module communicate through a pair of virtual terminal;

an Internet Protocol (IP) protocol stack of said terminal further encapsulating said second data packet with one layer of IP header based on a WIFI link to generate a third data packet, and sending said third data packet to a Wireless Access Gateway (WAG) through said WIFI link;

after receiving said third data packet, said WAG analyzing and dropping the IP header and TUNNEL header of said third data packet to recover the first data packet, and sending a recovered first data packet to said PDSN; and after receiving said recovered first data packet, said PDSN carrying out analysis processing, and establishing a link connection between said PDSN and said terminal.

Preferably, the step of said terminal directly accessing the service server to register through the WIFI module is:

said terminal directly accessing said service server to register through a local IP address of a WIFI network interface WIFI-IP.

Preferably, said parameter information includes:

an IP address of said WAG WAG-IP, and a parameter marking code Stream ID and a destination port Dest-Port during carrying out TUNNEL header encapsulation.

Preferably, a destination IP address in the IP header of said third data packet is said IP address of said WAG WAG-IP.

Preferably, said method further comprises:

said terminal setting up a pair of virtual terminal equipment in drive layer, and making said PPP module and said TUNNEL module communicate through said a pair of virtual terminal equipment, wherein, said a pair of virtual terminal equipment includes first virtual terminal equipment and second virtual terminal equipment, and said a pair of virtual terminal equipment is used for maintaining a receiving and sending queue, said a communication mode of said a pair of virtual terminal equipment is: data received by said first virtual terminal equipment being read in said second virtual terminal equipment, and data received by said second virtual terminal equipment being read in said first virtual terminal equipment.

Preferably, the step of said PPP module and said TUNNEL module communicating through said a pair of virtual terminal equipment comprises:

when said terminal starts said PPP module, specifying a parameter to make data of said PPP module being transmitted to said first virtual terminal equipment of said a pair of virtual terminal equipment; and when said terminal starts said TUNNEL module, opening said second virtual terminal equipment of said a pair of virtual terminal equipment.

Preferably, after the step of establishing the link connection between said PDSN and said terminal, said method further comprises:

said terminal generating a new PPP network interface, said terminal obtaining a local IP address Local-IP allocated by said PDSN; and said terminal setting a routing of which a destination address is WAG-IP of a WIFI network interface to direct to an original default routing of said WIFI network interface, deleting the original default routing of said WIFI network interface, taking a default routing of said PPP network interface as a default routing of said terminal, and forming a data packet interacting channel of the PPP link based on said WIFI link.

Preferably, after the step of taking the default routing of said PPP network interface as the default routing of said terminal, and forming the data packet interacting channel of the PPP link based on said WIFI link, said method further comprises:

an upper layer application receiving or sending packet data through said data packet interacting channel of the PPP link based on said WIFI link.

Preferably, the step of said upper layer application sending packet data through said data packet interacting channel of the PPP link based on said WIFI link comprises:

after IP protocol stack encapsulation is carried out for service data of said upper layer application APP, according to a default routing table entry of system, generating a first IP data packet which will be used for service interaction, wherein in the IP header of said first IP data packet, a source IP address is the local IP address Local-IP of the terminal, and a destination IP address is an IP address of a Public Data Network (PDN) or Internet to be accessed by said APP;

said PPP module carrying out PPP encapsulation on said first IP data packet to generate a second IP data packet encapsulating the PPP header, and sending said second IP data packet to the first virtual terminal equipment of said a pair of virtual terminal equipment;

said TUNNEL module starting the second virtual terminal equipment of said a pair of virtual terminal equipment, reading said second IP data packet, and according to said parameter information, further encapsulating said second IP data packet with one layer of TUNNEL header and outer IP header to generate a third IP data packet, wherein the destination IP address in the outer IP header of said third IP data packet is the WAG-IP, and said third IP data packet being sent to said WAG via a routing of said WIFI link by said WIFI network interface according to the destination address being a routing table entry of the WAG-IP;

after receiving said third IP data packet, said WAG analyzing and dropping said IP header and said TUNNEL header of said third IP data packet to recover said second IP data packet, and after carrying out Generic Routing Encapsulation (GRE) on a recovered second IP data packet, forwarding the recovered second IP data packet to said PDSN; and said PDSN carrying out the analysis processing on said recovered second IP data packet, and forwarding the first IP data packet to be used for interaction to the destination address.

The present invention also proposes a terminal, which comprises:

a Wireless Fidelity (WIFI) management module, which is configured to:
 directly access a service server to register through a WIFI module, and save parameter information returned from said service server after registering successfully; and
 set up first virtual terminal equipment and second virtual terminal equipment in a drive layer, wherein said first virtual terminal equipment and said second virtual terminal equipment are used for maintaining a receiving and sending queue;

a Point-to-Point (PPP) module, which is configured to: carry out PPP encapsulation on request information of establishing a PPP link to generate a first data packet encapsulating a PPP header, and send said first data packet to said first virtual terminal equipment;

a TUNNEL module, which is configured to: read said first data packet from said second virtual terminal equipment, and according to said parameter information, further encapsulate said first data packet with one layer of TUNNEL header to generate a second data packet; and an Internet Protocol (IP) protocol stack, which is configured to: further encapsulate said second data packet with one layer of IP header based on a WIFI link to generate a third data packet, and send said third data packet to a Wireless Access Gateway (WAG) through said WIFI module, thereby supporting to implement accessing a Packet Data Serving Node (PDSN) through WIFI.

Preferably, said WIFI management module is further configured to: directly access said service server to register through a local IP address of a WIFI network interface WIFI-IP.

Preferably, said parameter information includes:
an IP address of said WAG WAG-IP, and a parameter marking code Stream ID and a destination port Dest-Port during carrying out TUNNEL header encapsulation.

Preferably, a destination IP address in the IP header of said third data packet is said IP address of said WAG WAG-IP.

Preferably, said terminal further comprises:
a network setup module, which is configured to: generate a new PPP network interface, obtain a local IP address Local-IP allocated by said PDSN, and set a routing of which a destination address is WAG-IP of a WIFI network interface to direct to an original default routing of said WIFI network interface, and delete the original default routing of said WIFI network interface, and take a default routing of said PPP network interface as a default routing of said terminal, and form a data packet interacting channel of the PPP link based on said WIFI link.

Preferably, said PPP module is further configured to: carry out PPP encapsulation on a first IP data packet which will be used for service interaction to generate a second IP data packet encapsulating the PPP header, and send said second IP data packet to said first virtual terminal equipment of a pair of virtual terminal equipment;

said TUNNEL module is further configured to: start said second virtual terminal equipment of said a pair of virtual terminal equipment, read said second IP data packet, and according to said parameter information, further encapsulate said second IP data packet with one layer of TUNNEL header to generate a third IP data packet;

said IP protocol stack is further configured to: encapsulate service data of an upper layer application APP to generate the first IP data packet which will be used for service interaction, and encapsulate said third IP data packet with an outer IP header.

The present invention further proposes a system for accessing a Packet Data Serving Node (PDSN), and said system comprises a terminal, a Wireless Access Gateway (WAG) and a Packet Data Serving Node (PDSN); wherein, said terminal comprises:
a Wireless Fidelity (WIFI) management module, which is configured to:
 directly access a service server to register through a WIFI module, and save parameter information returned from said service server after registering successfully; and
 set up first virtual terminal equipment and second virtual terminal equipment in a drive layer, wherein said first virtual terminal equipment and said second virtual terminal equipment are used for maintaining a receiving and sending queue;

a Point-to-Point Protocol (PPP) module, which is configured to: carry out PPP encapsulation on request information of establishing a PPP link to generate a first data packet encapsulating a PPP header, and send said first data packet to said first virtual terminal equipment;

a TUNNEL module, which is configured to: read said first data packet from said second virtual terminal equipment, and according to said parameter information, further encapsulate said first data packet with one layer of TUNNEL header to generate a second data packet; and an Internet Protocol (IP) protocol stack, which is configured to: further encapsulate said second data packet with one layer of IP header based on a WIFI link to generate a third data packet, and send said third data packet to the WAG through said WIFI module, said WAG is configured to: receive said third data packet, analyze and drop the IP header and TUNNEL header to recover the first data packet, and carry out Generic Routing Encapsulation (GRE) on a recovered first data packet, and forwards said recovered first data packet to said PDSN;

said PDSN is configured to: after carrying out analysis processing on said recovered first data packet, establish a link connection with said terminal;

thereby supporting to implement accessing the PDSN through WIFI.

Preferably, said WIFI management module is further configured to: directly access said service server to register through a local IP address of a WIFI network interface WIFI-IP.

Preferably, said parameter information includes:

an IP address of said WAG WAG-IP, and a parameter marking code Stream ID and a destination port Dest-Port during carrying out TUNNEL header encapsulation.

Preferably, a destination IP address in the IP header of said third data packet is said IP address of said WAG WAG-IP.

Preferably, said terminal further comprises:

a network setup module, which is configured to: generate a new PPP network interface, obtain a local IP address Local-IP allocated by said PDSN, and set a routing of which a destination address is WAG-IP of a WIFI network interface to direct to an original default routing of said WIFI network interface, and delete the original default routing of said WIFI network interface, and take a default routing of said PPP network interface as a default routing of said terminal, and form a data packet interacting channel of the PPP link based on said WIFI link.

Preferably, said PPP module is further configured to: carry out PPP encapsulation on a first IP data packet which will be used for service interaction to generate a second IP data packet encapsulating the PPP header, and send said second IP data packet to said first virtual terminal equipment of a pair of virtual terminal equipment;

said TUNNEL module is further configured to: start said second virtual terminal equipment of said a pair of virtual terminal equipment, read said second IP data packet, and according to said parameter information, further encapsulate said second IP data packet with one layer of TUNNEL header to generate a third IP data packet;

said IP protocol stack is further configured to: encapsulate service data of an upper layer application APP to generate the first IP data packet which will be used for service interaction, and encapsulate said third IP data packet with an outer IP header;

said wireless access gateway is further configured to: receive said third IP data packet, analyze and drop said TUNNEL header and outer IP header of said third IP data packet to recover said second IP data packet, and after further carrying out Generic Routing Encapsulation (GRE) on a recovered second IP data packet, forward said recovered second IP data packet to said PDSN;

said PDSN is further configured to carry out the analysis processing on said recovered second IP data packet, and forward the first IP data packet which will be used for interaction to the destination address.

The technical scheme of the present invention further establishes a PPP link on the WIFI link, and the data packet interacting channel is the PPP link based on the WIFI link, and therefore, the scheme provided by the present invention enables the terminal to access the PDSN at a speed which is higher than the speed of accessing the cellular mobile communication network, thereby implementing various data services provided by the PDN. Since it is based on the TUNNEL layer, accessing the PDN or Internet through the WLAN (WIFI) should pass through the Wireless Access Gateway (WAG), and therefore, service operators can implement service differentiation, information management and related function extension very conveniently on the WAG and TUNNEAL protocol level.

BRIEF DESCRIPTION OF DRAWINGS

In order to more clearly describe the technical scheme of the examples of the present invention or in the prior art, it will briefly introduce the figures used in the description of the examples or the prior art below, and obviously, the figures in the following description are only a plurality of examples of the present invention, and for ordinary person skilled in the art, others figures can be obtained according to these figures in the prerequisite that creative work is not needed.

PREFERRED EMBODIMENTS OF THE PRESENT INVENTION

It will clearly and fully describe the technical scheme in examples of the present invention with reference to the figures in examples of the present invention below, and obviously, the described examples are only a part of examples of the present invention instead of all the examples. Base on examples of the present invention, all other examples obtained by ordinary person skilled in the art in the prerequisite that creative work is not done will fall into the protection scope of the present invention.

Figure 1:
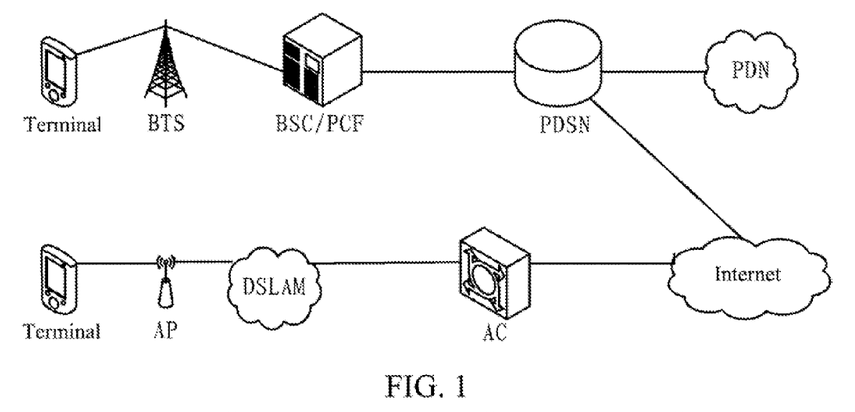
FIG. 1 is a system composition diagram when a user uses the data services in the prior art.
Figure 2:
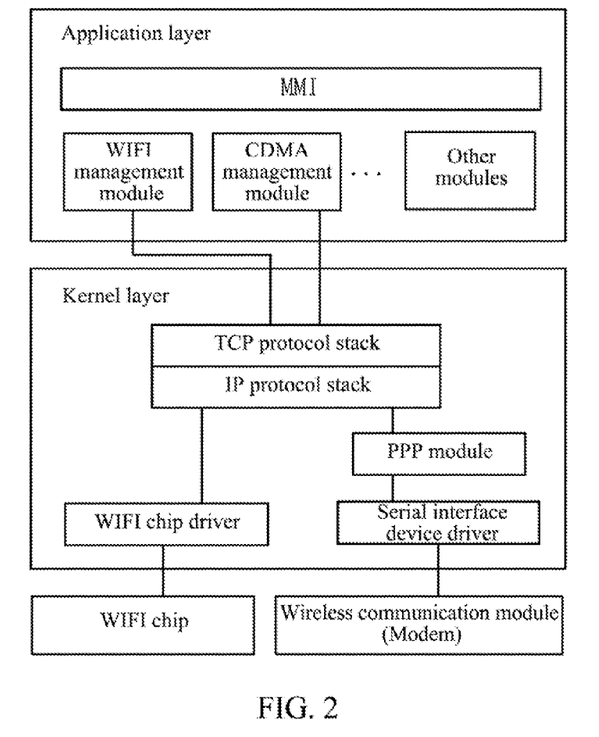
FIG. 2 is an architecture diagram of system software in the terminal side according to the prior art.

The terminal will take the 3G/WIFI dual-mode mobile phone as an example and the cellular mobile communication network will take the CDMA2000 as an example to describe the user using the data services. With reference to FIG. 1, in the prior art, when a user uses the data services, there are two modes, and the system software architecture of the terminal side is as shown in FIG. 2:

mode one, the terminal accesses a Packet Data Serving Node (PDSN) through the Base Transceiver Station (BTS), and via a Broadwidth Serve Controller (BSC) by a CDMA dialing mode, and then uses the data service of the Packet Data Network (PDN) or accesses the Internet. In a view from the terminal, the service flow of this mode is: the upper layer data service application (APP) generating the IP network data packet which will be used for service interaction by the TCP/IP protocol stack, and then encapsulating IP data packets through the PPP layer, and the physical layer thereof being a wireless communication module (Modem), and sending PPP data packets to the BTS by an air interface of the Modem, and then the BTS finally sending data packets to the PDSN through other network transmission devices. The PDSN mainly implements functions of link negotiation based on the PPP, connection of the packet data service network, and related authentication with the terminals. The terminal and the PDSN negotiate each parameter of the PPP protocol, and after negotiating parameters successfully, establish one PPP link between this terminal and the PDSN of the CDMA network. Based on this link, the user can use data services of the PDN and a plurality of Internet services, and the data packet interacting channel is the PPP link established by negotiation.

Mode two, the terminal connects the (Wireless) Access Point (AP) by the WIFI, and, directly accesses the Internet through the local area or metropolitan area network (Digital Subscriber Line Access Multiplexer, DSLAM), and via a wireless Access Controller (AC). In a view from the terminal, the difference from the service flow of the mode one is, in this mode, firstly accessing the AP by the WIFI module and establishing a WIFI link. When the data service is used, APP generates IP network data packets which will be used for service interaction by TCP/IP protocol stacks, and the PPP encapsulation will not be carried out for data any more, and the network link layer and physical layer thereof use the WIFI module based on the 802.11b protocol, and IP data packets are directly sent to the AP by the WIFI module, and the AP is equivalent to a bridge between the traditional wired local area network and the wireless local area network, thereby forwarding IP data packets to the Internet network which has been constructed, and the data packet interacting channel thereof is the WIFI link.

Figure 3:
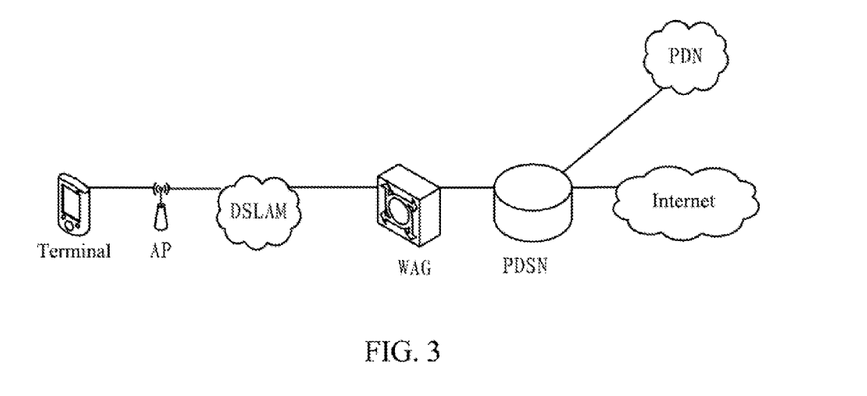
FIG. 3 is a system composition diagram of the data service implementation scheme according to the present invention.
Figure 4:
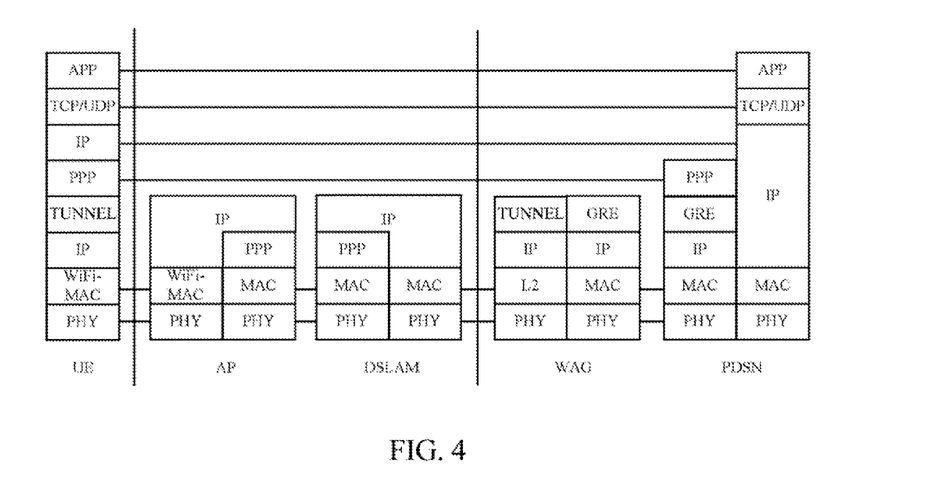
FIG. 4 is a specific schematic diagram of the implementation process according to the present invention.
Figure 5:
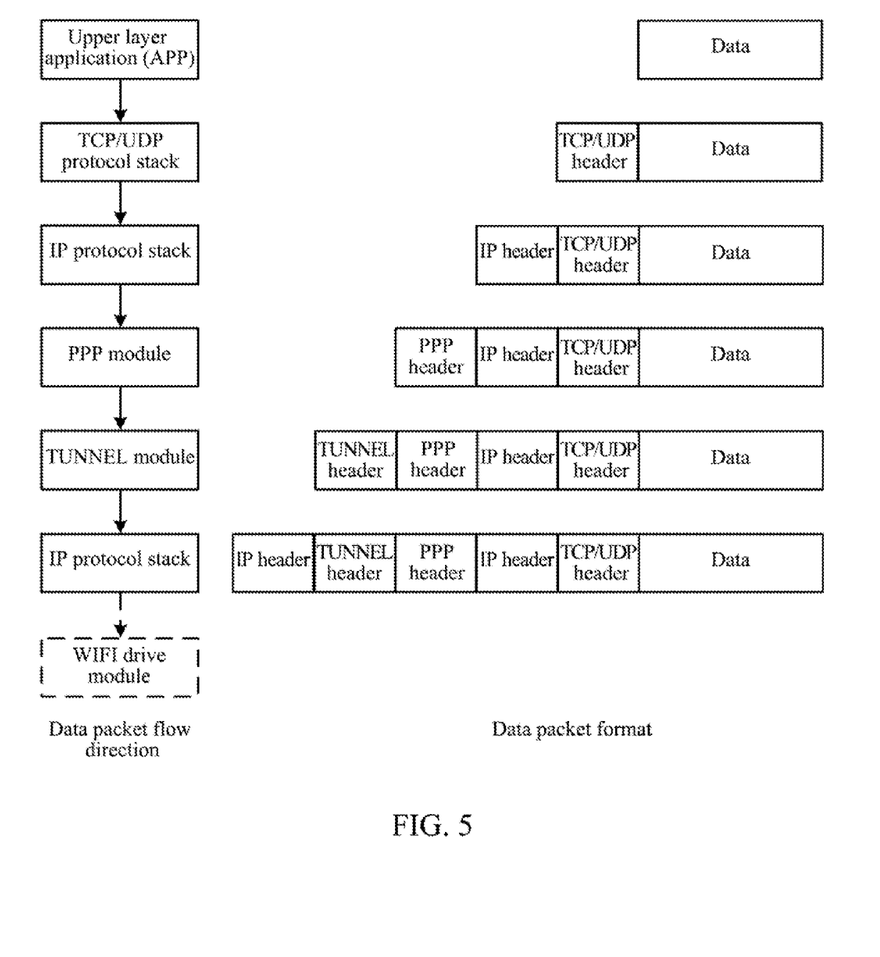
FIG. 5 is a diagram of the data packet format and the flow direction of the data packet in various layers according to the present invention.

The implementation scheme of the data service according to the present invention is as shown in FIG. 3, and when a user uses the data service, the APP generates network data packets which will be used for interaction by TCP/IP protocol stacks, and the TUNNEL is a service tunnel between the terminal and a Wireless Access Gateway (WAG), and the WAG is the gateway completing the WIFI access authentication, service connection management and data transmission and so on. The implementation scheme of accessing the PDSN by the WIFI is essentially a process of further establishing the PPP link on the WIFI link implemented by the TUNNEL layer. The fundamental difference of these two modes in the prior art is that when the data service is used in this mode, the data packet interacting channel is the PPP link based on the WIFI link. With reference to FIG. 4, it is the specific schematic diagram of the implementation process according to the present invention, and with reference to FIG. 5, it is a diagram of the data packet format and the flow direction of the data packet in various layers according to the present invention.

Figure 6:
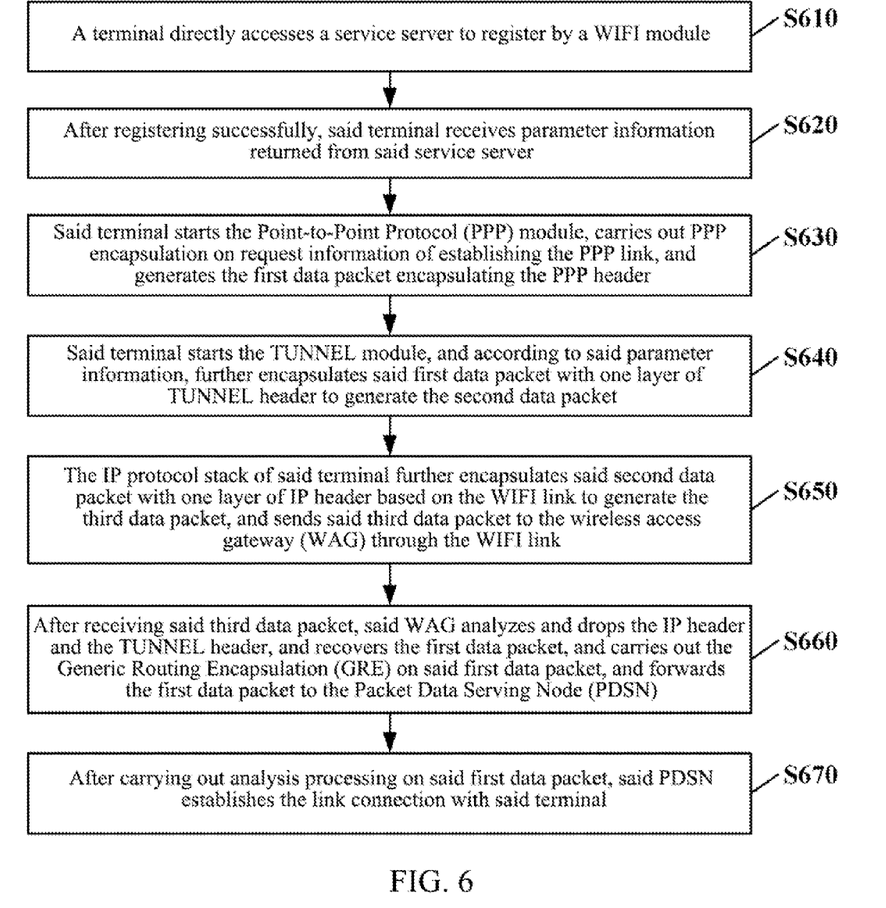
FIG. 6 is a flow chart of the first example of the method for accessing the packet data serving node according to the present invention.

With reference to FIG. 6, it shows a flow chart of the first example of the method for accessing the packet data serving node according to the present invention, comprising steps of:

step S610, a terminal directly accessing a service server to register by a WIFI module.

Said terminal directly accesses the service server to register by the local IP address of the WIFI network interface WIFI-IP.

Before carrying out the data service, at first the terminal should register to the service server such as the SIP server and so on, and at this time, the terminal uses the default routing of the WIFI network interface.

Step S620, after registering successfully, said terminal receives parameter information returned from said service server.

After registering successfully, the terminal will obtain the IP address of the Wireless Access Gateway (WAG) WAG-IP, and parameters such as the necessary parameter marking code Stream ID and the destination port Dest-Port and so on during carrying out the TUNNEL header encapsulation.

Step S630, said terminal starts the Point-to-Point Protocol (PPP) module, carries out PPP encapsulation on request information of establishing the PPP link, and generates the first data packet encapsulating the PPP header.

The terminal carries out the PPP link establishment, and the PPP protocol layer will send first data packet encapsulating the PPP header including the link establishment request, and parameter negotiation and so on, and sends said first data packet to the first virtual terminal equipment.

Said terminal sets up a pair of virtual terminal equipment in the drive layer, and said a pair of virtual terminal equipment is the first virtual terminal equipment and the second virtual terminal equipment, and said a pair of virtual terminal equipment is used for maintaining one receiving and sending queue, and can carry out communication which is similar to a channel, and communication relationship of the pair of virtual terminal equipment is: the data received by said first virtual terminal equipment being read in said second virtual terminal equipment, and the data received by said second virtual terminal equipment being read in said first virtual terminal equipment.

When said terminal starts the PPP module, the terminal makes said PPP module use a piece of virtual terminal equipment to transmit data by specifying parameters instead of the practical physical serial interface, and in this example, said first data packet is sent by said first virtual terminal equipment, and certainly, said first data packet also can be sent by the second virtual terminal equipment.

Step S640, said terminal starts the TUNNEL module, and according to said parameter information, further encapsulates said first data packet with one layer of TUNNEL header to generate the second data packet.

Said TUNNEL module opens the second virtual terminal equipment corresponding to said first virtual terminal equipment, and reads said first data packet through the second virtual terminal equipment.

Said PPP module communicates with said TUNNEL module through a pair of virtual terminal equipment, and when the PPP module will send data, the data packet will be sent to the first virtual terminal equipment, and said TUNNEL module reads this data through the second virtual terminal equipment corresponding to said first virtual terminal equipment; when said PPP module will receive data, said TUNNEL module receives the data packet sent from the WAG-IP through the Socket interface, and after decapsulating the TUNNEL header of the data packet and so on, sends the data packet to the second virtual terminal equipment, and said PPP module can receive this data through the first virtual terminal equipment paired with the second virtual terminal equipment. Said first virtual terminal equipment and second virtual terminal equipment are not specifically referred, namely said PPP module is also able to send data to said second virtual terminal equipment, or receive data in the second virtual terminal equipment, and said TUNNEL module is also able to send data to the first virtual terminal equipment, or receive data in the first virtual terminal equipment.

Figure 7:
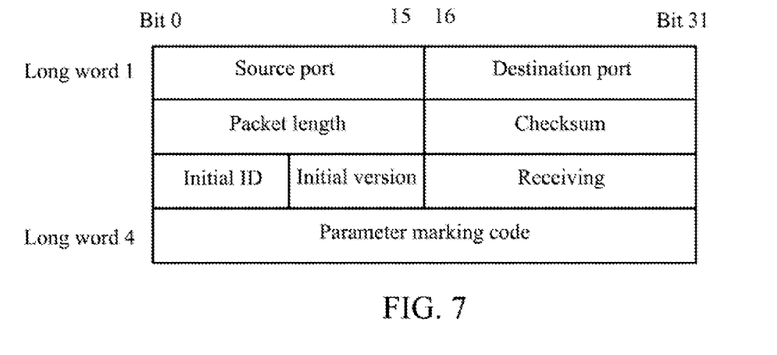
FIG. 7 is the encapsulation format of the TUNNEL protocol according to the present invention.

After receiving the first data packet, according to said parameter information, said TUNNEL module further encapsulates said first data packet with one layer of TUNNEL header to generate the second data packet. The encapsulation format of said TUNNEL protocol is shown in FIG. 7, including a parameter marking code Stream ID, a destination port Dest-Port, an initial Proto ID, an initial version Proto Ver, a CheckSum and a packet length Pkt Length, wherein said Stream ID and Dest-Port fields are corresponding parameters obtained in step S620, and the Proto ID, Proto Ver and CheckSum fields are fixed values within the module, and the Pkt Length field is the length value of the whole packet after encapsulating the TUNNEL header.

Step S650, the IP protocol stack of said terminal further encapsulates said second data packet with one layer of IP header based on the WIFI link to generate the third data packet, and sends said third data packet to the wireless access gateway (WAG) through the WIFI link.

The destination IP address in the IP header of said third data packet is the IP address of the WAG WAG-IP.

Said third data packet is transmitted to the WAG through the WIFI link via the DSLAM.

Step S660, after receiving said third data packet, said WAG analyzes and drops the IP header and the TUNNEL header, and recovers the first data packet, and carries out the Generic Routing Encapsulation (GRE) on said first data packet, and forwards the first data packet to the Packet Data Serving Node (PDSN).

Step S670, after carrying out analysis processing on said first data packet, said PDSN establishes the link connection with said terminal.

Said PDSN further analyzes said first data packet, and responds to the link establishment data packet of the PPP module, and carries out negotiation of aspects such as the Maximum Receive Unit (MRU) and IP address allocation and so on, thereby completing the link establishment.

Figure 8:
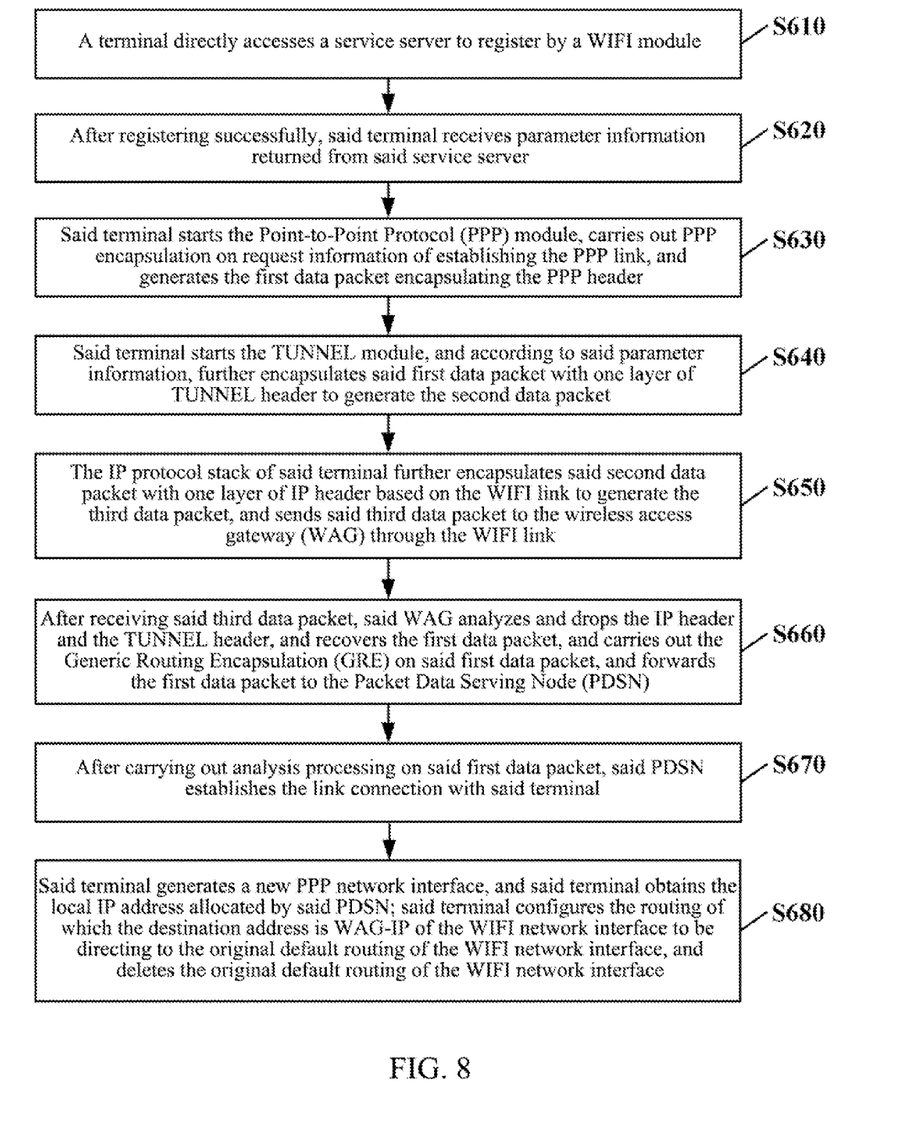
FIG. 8 is another flow chart of the first example of the method for accessing the packet data serving node in FIG. 6.

With reference to FIG. 8, after establishing a link, the method can further comprise:

step S680, said terminal generates a new PPP network interface, and said terminal obtains the local IP address Local-IP allocated by said PDSN; said terminal configures a routing of which the destination address is WAG-IP of the WIFI network interface to direct to the original default routing of the WIFI network interface, and deletes the original default routing of the WIFI network interface, and takes the default routing of the PPP network interface as the default routing of said terminal.

After establishing the link, the terminal obtains the IP address allocated by the PDSN, and in a case of dual IP, one routing of which destination address is WAG-IP is added, directing to the routing table entry of the original default routing of the WIFI network interface, and the system default routing is modified from the original default routing of the WIFI network interface into the default routing of the PPP network interface. The compulsory routing is carried out by the above modification to form the data packet interacting channel of the PPP link based on the WIFI link.

Thus when the upper layer accesses the PDSN, it is ensured that the system default routing table entry will be selected, namely the default routing of the PPP network interface, and then encapsulation of the PPP protocol layer is carried out, and after the TUNNEL encapsulation, the data packet is sent to the destination IP address WAG-IP in the form of IP data packets, and according to the routing table entry at this time, is finally sent out through the WIFI network interface. According to this compulsory routing method, the requirements in the specifications can be implemented without any modifications of service software in the upper layer.

After the link is established, said terminal can use the data services based on this link, and then carries out the exchange of data services.

Figure 9:
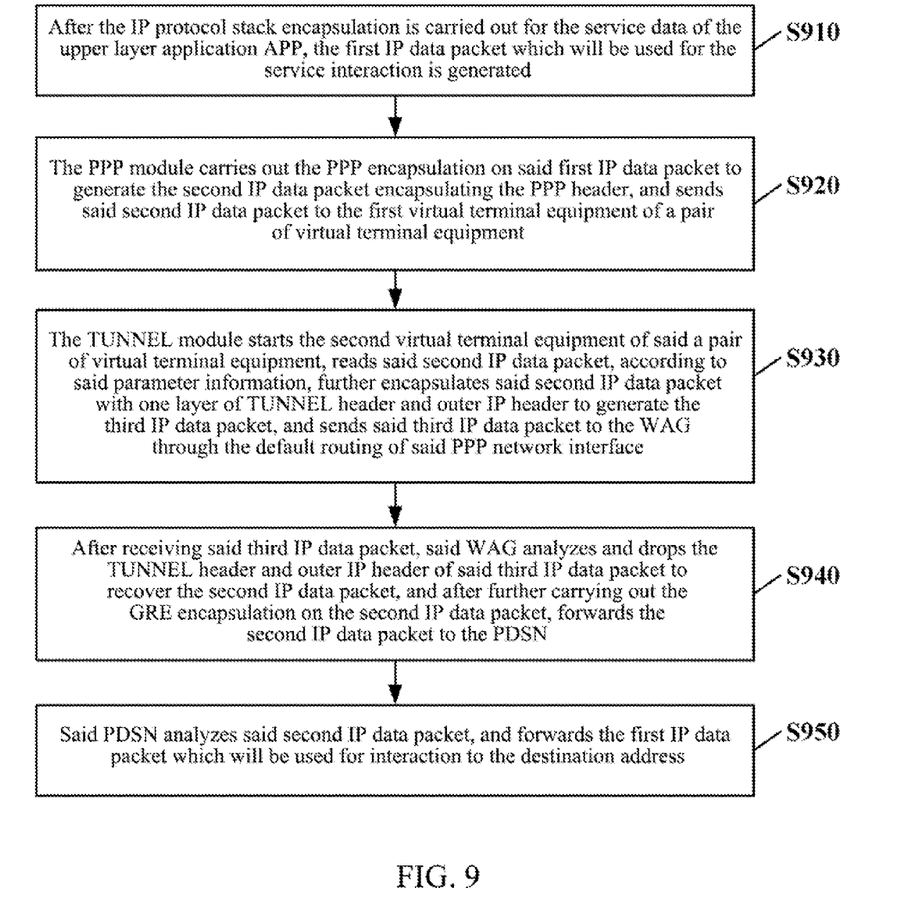
FIG. 9 is a flow chart of the second example of the method for accessing the packet data serving node according to the present invention.

With reference to FIG. 9, it shows a flow chart of the second example of the method for accessing a packet data serving node (PDSN) according to the present invention. Said technical scheme of this example comprises a link establishment process and a packet data transmission process, and said link establishment process has been described in the first example in detail, and herein it will not be repeated, and it can refers to the description of the relevant parts in the first example; it will describe the data transmission process after the link establishment and routing modification in detail below, and the person skilled in the art could understand that the data transmission process comprises the receiving data and sending data, and the following will mainly describe the process of sending data in the terminal side, and based on the inverse process of this process, the terminal also can utilize this PPP link to receive the packet data, thereby implementing the data service interaction between the terminal and the PDN or Internet.

Step S910, after the IP protocol stack encapsulation is carried out for the service data of the upper layer application APP, the first IP data packet which will be used for service interaction is generated.

When a user uses the data service, after the IP protocol stack encapsulation is carried out for the upper layer application APP, the first IP data packet which will be used for service interaction is generated, and in the IP header of said first IP data packet, the source IP address is the local IP address Local-IP of terminal, and the destination IP address is the IP address of the Public Data Network (PDN) or Internet to be accessed by the APP.

Step S920, the PPP module carries out the PPP encapsulation on said first IP data packet to generate the second IP data packet encapsulating the PPP header, and sends said second IP data packet to the first virtual terminal equipment of a pair of virtual terminal equipment.

Step S930, the TUNNEL module starts the second virtual terminal equipment of said a pair of virtual terminal equipment, and reads said second IP data packet, and according to said parameter information, further encapsulates said second IP data packet with one layer of TUNNEL header and outer IP header to generate the third IP data packet, and sends said third IP data packet to the WAG through the default routing of said PPP network interface.

The destination IP address in the outer IP header of said third IP data packet is the WAG-IP.

Step S940, after receiving said third IP data packet, said WAG analyzes and drops the TUNNEL header and outer IP header of said third IP data packet to recover the second IP data packet, and after further carrying out the GRE encapsulation on the second IP data packet, forwards the second IP data packet to the PDSN.

Step S950, said PDSN analyzes said second IP data packet, and forwards the first IP data packet which will be used for interaction to the destination address.

According to above steps, the terminal sending data to the destination address in the PDN or Internet is completed, and based on the inverse process of above steps, said terminal can receive data sent from the PDN or Internet, thereby completing the data interaction between the terminal and the destination address in the PDN or Internet. In order to save the space, herein it will not describe this inverse process any more.

Said technical scheme of the present invention is that the PPP link is further established on the WIFI link, and after establishing the link, the terminal obtains the IP address allocated by the PDSN, and in the case of dual IP, one routing of which destination address is WAG-IP is added, directing to routing table entry of the original default routing of the WIFI network interface, and the default routing of system is modified from the original default routing of the original WIFI network interface into the default routing of the PPP network interface. According to the above modification, the compulsory routing is carried out, and the data packet interacting channel of the PPP link based on the WIFI link is formed, and receiving and sending the packet data is carried out in this channel. The present invention makes the terminal enable to access the PDSN at a speed which is higher than that of accessing the cellular mobile communication network. In the case of dual IP, the WIFI function is utilized to carry out the various data services provided by the PDN, and it is convenient for the service operator to implement the service differentiation, information management and related function extension on the TUNNEL protocol level.

Figure 10:
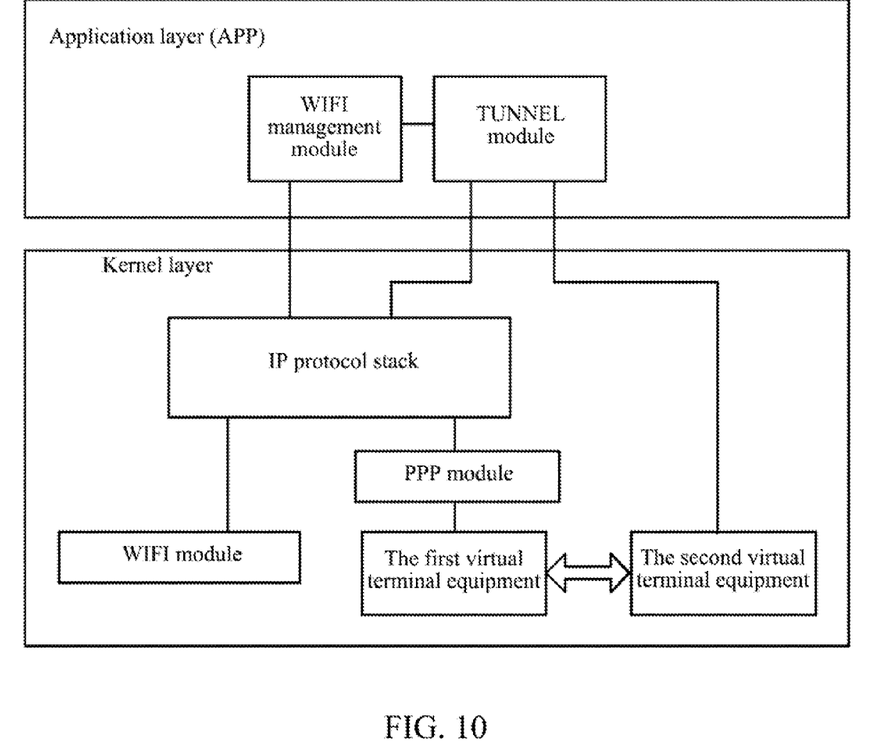
FIG. 10 is a composition structure diagram of a terminal in the first example according to the present invention.

With reference to FIG. 10, it shows a composition structure diagram of a terminal in the first example according to the present invention. Said terminal comprises:

a WIFI management module, which is used for directly accessing the service server to register through the WIFI module, and saving parameter information returned by said service server after registering successfully.

The first virtual terminal equipment and second virtual terminal equipment, which are set up in the drive layer preferably, and are used for maintaining a receiving and sending queue.

A PPP module, which is used for carrying out PPP encapsulation on request information of establishing a PPP link to generate the first data packet encapsulating the PPP header, and sending said first data packet to said first virtual terminal equipment.

A TUNNEL module, which is used for reading said first data packet from said second virtual terminal equipment, and according to said parameter information, further encapsulating said first data packet with one layer of TUNNEL header to generate the second data packet.

An IP protocol stack, which is used for further encapsulating said second data packet with one layer of IP header based on the WIFI link to generate the third data packet, and sending said third data packet to the wireless access gateway (WAG) through said WIFI module.

Said terminal further comprises a network setup module, which if used for generating a new PPP network interface, obtaining the local IP address Local-IP allocated by said PDSN, setting the routing of which destination address is WAG-IP of the WIFI network interface to be directing to the original default routing of the WIFI network interface, and deleting the original default routing of the WIFI network interface, and taking the default routing of the PPP network interface as the default routing of said terminal.

Said PPP module of said terminal is also used for carrying out PPP encapsulation on the first IP data packet which will be used for service interaction to generate the second IP data packet encapsulating the PPP header, and sending said second IP data packet to the first virtual terminal equipment of a pair of virtual terminal equipment.

Said TUNNEL module is further used for starting the second virtual terminal equipment of a pair of virtual terminal equipment, reading said second IP data packet, and according to said parameter information, further encapsulating said second IP data packet with one layer of TUNNEL header to generate the third IP data packet.

Said IP protocol stack is further used for generating the first IP data packet which will be used for service interaction after the IP protocol stack encapsulation is carried out for the service data of the upper layer application APP, and encapsulating said third IP data packet with the outer IP header.

The working process and working principle of said terminal have been described in the method examples in detail, and herein it will not be repeated, and it can refer to the description of relevant parts.

This example only describes the terminal sending data, and the person skilled in the art could understand that for receiving data from the PDN or Internet, each component of said terminal can be completed based on the inverse process, and in order to save space, it will not be repeated.

The present invention also discloses a system for accessing a Packet Data Serving Node (PDSN), and said system comprises a terminal, a Wireless Access Gateway (WAG) and a Packet Data Serving Node (PDSN).

Said terminal comprises:

a WIFI management module, which is used for directly accessing the service server to register through the WIFI module, and saving parameter information returned by said service server after registering successfully.

The first virtual terminal equipment and second virtual terminal equipment set up in the drive layer, which are used for maintaining a receiving and sending queue.

A PPP module, which is used for carrying PPP encapsulation on request information of establishing a PPP link to generate the first data packet encapsulating the PPP header, and sending said first data packet to said first virtual terminal equipment.

A TUNNEL module, which is used for reading said first data packet from said second virtual terminal equipment, and according to said parameter information, further encapsulating said first data packet with one layer of TUNNEL header to generate the second data packet.

An IP protocol stack, which is used for further encapsulating said second data packet with one layer of IP header based on the WIFI link to generate the third data packet, and sending said third data packet to the wireless access gateway (WAG) through said WIFI module.

Said Wireless Access Gateway (WAG) is used for receiving said third data packet, analyzing and dropping the IP header and TUNNEL header, recovering the first data packet, and carrying out Generic Routing Encapsulation (GRE) on said first data packet, and forwarding the first data packet to said Packet Data Serving Node (PDSN).

Said Packet Data Serving Node (PDSN) is used for establishing a link connection with said terminal after carrying out analysis processing on said first data packet.

Said PPP module is further used for carrying out PPP encapsulation on the first IP data packet which will be used for service interaction to generate the second IP data packet encapsulating the PPP header, and sending said second IP data packet to the first virtual terminal equipment of a pair of virtual terminal equipment.

Said TUNNEL module is further used for starting the second virtual terminal equipment of a pair of virtual terminal equipment, reading said second IP data packet, and according to said parameter information, further encapsulating said second IP data packet with one layer of TUNNEL header to generate the third IP data packet.

Said IP protocol stack is further used for encapsulating the service data of the upper layer application APP to generate the first IP data packet which will be used for service interaction, and encapsulating said third IP data packet with the outer IP header.

Said wireless access gateway is further used for receiving said third data packet, analyzing and dropping the TUNNEL header and outer IP header of said third IP data packet, recovering the second IP data packet, and forwarding the second IP data packet to said PDSN after further carrying out GRE encapsulation on said second IP data packet.

Said PDSN is further used for analyzing said second IP data packet, and forwarding the first IP data packet which will be used for interaction to the destination address.

The working process and working principle of said system have been described in the method examples in detail, and herein it will not be repeated, and it can refer to the description of relevant parts.

This example only describes the system sending data, and the person skilled in the art could understand that for receiving data from the PDN or Internet, each component of said system can be completed based on the inverse process, and in order to save space, it will not be repeated.

At present, there are a large number of software architectures of the 3G/WIFI dual mode terminal, such as the Linux platform, Windows Mobile platform and so on, and the following will take the Linux platform as an example to describe a preferable example of the present invention in detail, and undoubtedly, the present invention also can be implemented in other platforms.

Figure 11:
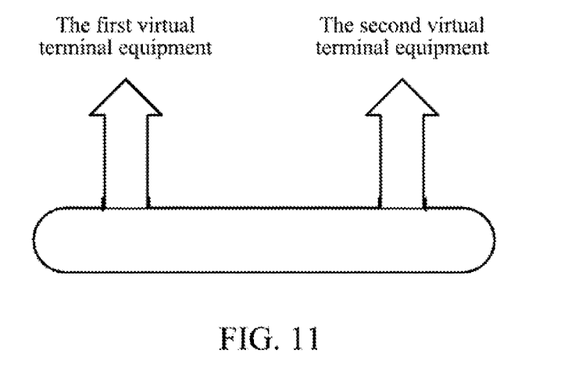
FIG. 11 is a communication relationship diagram of a pair of virtual terminal equipment according to the present invention.

Step 1, in the drive layer, two paired virtual terminal equipment only for maintaining a receiving and sending queue is implemented, as shown in FIG. 11, namely the M-TTY (the master virtual terminal equipment or the first virtual terminal equipment) and the S-TTY (the slave virtual terminal equipment or the second virtual terminal equipment), and the pseudo terminal (PTY) in the Linux OS just satisfies this demand, and the PTY is a group of logical equipment implemented in the Linux kernel, and exists in pair, and its bottom layer is the channel based on the STREAMS. When the kernel is compiled, the UNIX98 PTY support under the Character devices item is selected to enable the kernel to support the pseudo terminal function.

The Linux has a plurality of groups of such equipment, which respectively correspond to the master equipment: /dev/ptyp0~f, and the slave equipment: /dev/ttyp0~f under the 2.4 kernel. Generally, the master equipment should be opened at first, and then the slave equipment is opened and can be quoted after a series of configurations of unlocking, authority and line rules are carried out. This example only needs a pair of pseudo terminals, /dev/ptyp0 and /dev/ttyp0, and at the same time both of the master and slave equipment should be configured to RAW mode.

Step 2, when the user starts to use the data service, after selecting the WIFI access, the WIFI management module deals, and after connecting to the AP successfully, at this time the unique network interface of the current system, WIFI network interface (eth0), is formed in the terminal, and takes the default routing of the eth0 as the default routing of the system.

Step 3, the WIFI management module will access the service server to register through the eth0, and after registering successfully, according to operators' specifications, the service server will attach the following parameters in the returned message of registering successfully: the WAG-IP, and the necessary parameters Stream ID and Dest-Port during encapsulating and analyzing the TUNNEL header, and the WIFI management module can save these parameters into one local configuration file e.g. the tunnel.conf.

Step 4, the WIFI management module starts the PPP module to establish the PPP link, and in the Linux platform, one process can be used to start the PPP module by calling the "pppd/dev/ptyp0 &", and the parameter /dev/ptyp0 is specified rearwards to use a piece of virtual terminal equipment to transmit the PPP data packet instead of the practical physical serial interface.

Step 5, the WIFI management module calls the "ppptun1/dev/tt0 &", and uses one process to start the TUNNEL module, which will open the slave equipment /dev/ttyp0 paired with the /dev/ptyp0 to implement the communication between the TUNNEL module and the PPP module.

Step 6, when the PPP module will send data, the data packet will be sent to the /dev/ptyp0, and the TUNNEL module will read this data through the equipment /dev/ttyp0, and reads related parameters from previous recorded tunnel.conf file, and then carries out encapsulation according to the format of the TUNNEL protocol as shown in FIG. 7, and finally sends the encapsulated data packet to the WAG-IP through the Socket interface.

Step 7, when the PPP module will receive data, the TUNENL module receives the IP data packet sent from the WAG-IP through the Socket interface, and after decapsulating the TUUNEL header and so on, sends it to the /dev/ttyp0 equipment, and the PPP module can receive these data through the /dev/ttyp0 equipment.

Step 8, the initial stage is to carry out the negotiation process of the PPP protocol parameters, and after completion of negotiation, the PPP link is established successfully, and one new PPP network interface (ppp0) is generated.

Step 9, the routing list is modified, and this step can be implemented by using the network tool IP command under the Linux, and also can be implemented by codes. At first, one table entry is added into the eth0, and the routing whose destination address is WAG-IP passes through the original default routing of the eth0, and then the default routing of the eth0 in the system is deleted and the current default routing of the ppp0 is taken as the default routing of the system, thereby implementing the function of forwarding data through the TUNNEL in a case of dual IP.

Step 10, when the user carries out the data service interaction, the receiving and sending of packet data will be carried out according to steps 6 and 7.

Step 11, when the user terminates the data service interaction, the upper layer application will notify the WIFI management module, and then the WIFI module will turn off the running TUNNEL and PPP processes, and destroy all the intermediate processes, and recover to the initial state.

The person skilled in the art could understand that all or part of the steps implementing above method examples can be implemented by the program commanding related hardware, and all the programs can be stored in one computer readable memory medium, and when this program is executed, the steps in the above method examples are included, and said memory medium includes the magnetic disk, optical disk, Read-Only Memory (ROM) or Random Access Memory (RAM) and so on. In each method example of the present invention, the sequence numbers of each step are unable to be used for limiting the order of steps, and for the person skilled in the art, in the prerequisite that creative work is not needed, the transformation of the order of steps also falls into the protection scope of the present invention.

The above description is only the preferable examples of the present invention, which is not for limiting the present invention, and all the modifications, equivalent replacement and improvements within the spirit or principle of the present invention shall all fall into the protection scope of the present invention.

Industrial Applicability

The technical scheme of the present invention is to further establish a PPP link on the WIFI link, and the data packet interacting channel is the PPP link based on the WIFI link, and therefore, the scheme provided by the present invention enables the terminal to access the PDSN at a speed which is higher than the speed of accessing the cellular mobile communication network, thereby implementing various data services provided by the PDN. Since it is based on the TUNNEL layer, accessing the PDN or Internet through the WLAN (WIFI) should pass through the Wireless Access Gateway (WAG), and therefore, service operators can implement service differentiation, information management and related function extension very conveniently on the WAG and TUNNEL protocol level.

What is claimed is:

1. A method for accessing a Packet Data Serving Node (PDSN), which comprises:
    a terminal directly accessing a service server to register through a Wireless Fidelity (WIFI) module;
    said terminal receiving parameter information returned from said service server after registering successfully;
    said terminal starting a Point-to-Point Protocol (PPP) module that encapsulates a request packet with a PPP header to generate a first data packet wherein said request packet contains information for establishing a PPP link with the PDSN;
    said terminal starting a TUNNEL module, and according to said parameter information, further encapsulating said first data packet with one layer of TUNNEL header to generate a second data packet, wherein said PPP module and said TUNNEL module communicate through a pair of virtual terminal equipment;
    an Internet Protocol (IP) protocol stack of said terminal further encapsulating said second data packet with one layer of IP header based on a WIFI link to generate a third data packet, and sending said third data packet to a Wireless Access Gateway (WAG) through said WIFI link;
    after receiving said third data packet, said WAG analyzing and dropping the IP header and TUNNEL header of said third data packet to recover the first data packet, and sending a recovered first data packet to said PDSN; and
    after receiving said recovered first data packet, said PDSN carrying out analysis processing, and establishing a link connection between said PDSN and said terminal;
    wherein after the step of establishing the link connection between said PDSN and said terminal, said method further comprises:
    said terminal generating a new PPP network interface, said terminal obtaining a local IP address Local-IP allocated by said PDSN; and
    said terminal setting a routing for the WIFI network interface with the destination address as the WAG-IP, accessing the original default routing of said WIFI network interface, and changing the original default routing of said terminal from the setting of WIFI network interface to that of the PPP network interface, thereby forming a data packet interacting channel of the PPP link based on said WIFI link.

2. The method as claimed in claim 1, wherein the step of said terminal directly accessing the service server to register through the WIFI module is:
    said terminal directly accessing said service server to register through a local IP address of a WIFI network interface WIFI-IP.

3. The method as claimed in claim 2, wherein said parameter information comprises:
    an IP address of said WAG WAG-IP, and a parameter marking code Stream ID and a destination port Dest-Port during carrying out TUNNEL header encapsulation.

4. The method as claimed in claim 3, wherein a destination IP address in the IP header of said third data packet is said IP address of said WAG WAG-IP.

5. The method as claimed in claim 4, which further comprises: said terminal setting up said a pair of virtual terminal equipment in drive layer, and making said PPP module and said TUNNEL module communicate through said a pair of virtual terminal equipment, wherein,
    said a pair of virtual terminal equipment includes first virtual terminal equipment and second virtual terminal equipment, and said a pair of virtual terminal equipment is used for maintaining a receiving and sending queue, said a communication mode of said a pair of virtual terminal equipment is: data received by said first virtual terminal equipment being read in said second virtual terminal equipment, and data received by said second virtual terminal equipment being read in said first virtual terminal equipment.

6. The method as claimed in claim 5, wherein the step of said PPP module and said TUNNEL module communicating through said a pair of virtual terminal equipment comprises:
    when said terminal starts said PPP module, specifying a parameter to make data of said PPP module being transmitted to said first virtual terminal equipment of said a pair of virtual terminal equipment; and
    when said terminal starts said TUNNEL module, opening said second virtual terminal equipment of said a pair of virtual terminal equipment.

7. The method as claimed in claim 1, wherein after the step of taking the default routing of said PPP network interface as the default routing of said terminal, and forming the data packet interacting channel of the PPP link based on said WIFI link, said method further comprises:
    an upper layer application receiving or sending packet data through said data packet interacting channel of the PPP link based on said WIFI link.

8. The method as claimed in claim 7, wherein the step of said upper layer application sending packet data through said data packet interacting channel of the PPP link based on said WIFI link comprises:
    after IP protocol stack encapsulation is carried out for service data of said upper layer application APP, according to a default routing table entry of system, generating a first IP data packet which will be used for service interaction, wherein in the IP header of said first IP data packet, a source IP address is the local IP address Local-IP of the terminal, and a destination IP address is an IP address of a Public Data Network (PDN) or Internet to be accessed by said APP;

said PPP module carrying out PPP encapsulation on said first IP data packet to generate a second IP data packet encapsulating the PPP header, and sending said second IP data packet to first virtual terminal equipment of said a pair of virtual terminal equipment;

said TUNNEL module starting second virtual terminal equipment of said a pair of virtual terminal equipment, reading said second IP data packet, and according to said parameter information, further encapsulating said second IP data packet with one layer of TUNNEL header and outer IP header to generate a third IP data packet, wherein the destination IP address in the outer IP header of said third IP data packet is the WAG-IP, and said third IP data packet is sent to said WAG via a routing of said WIFI link by said WIFI network interface according to a routing table entry of which the destination address is the WAG-IP;

after receiving said third IP data packet, said WAG analyzing and dropping said IP header and said TUNNEL header of said third IP data packet to recover said second IP data packet, and after carrying out Generic Routing Encapsulation (GRE) on a recovered second IP data packet, forwarding the recovered second IP data packet to said PDSN; and said PDSN carrying out the analysis processing on said recovered second IP data packet, and forwarding the first IP data packet which will be used for interaction to the destination address.

9. A terminal, which comprises: one or more processors; a Wireless Fidelity (WIFI) management module, a Point-to-Point Protocol (PPP) module, a TUNNEL module, an Internet Protocol (IP) protocol stack, and a network setup module, wherein the above modules are stored on a non-transitory computer readable storage medium;

the Wireless Fidelity (WIFI) management module is configured to:
  directly access a service server to register through a WIFI module, and save parameter information returned from said service server after registering successfully; and
  set up first virtual terminal equipment and second virtual terminal equipment in a drive layer, wherein said first virtual terminal equipment and said second virtual terminal equipment are used for maintaining a receiving and sending queue;

the Point-to-Point Protocol (PPP) module is configured to: encapsulate a request packet with a PPP header to generate a first data packet wherein said request packet contains information for establishing a PPP link with the PDSN, and send said first data packet to said first virtual terminal equipment;

the TUNNEL module is configured to: read said first data packet from said second virtual terminal equipment, and according to said parameter information, further encapsulate said first data packet with one layer of TUNNEL header to generate a second data packet; and the Internet Protocol (IP) protocol stack is configured to: further encapsulate said second data packet with one layer of IP header based on a WIFI link to generate a third data packet, and send said third data packet to a Wireless Access Gateway (WAG) through said WIFI module;

the network setup module is configured to: generate a new PPP network interface, and obtain a local IP address Local-IP allocated by said PDSN, and set a routing for the WIFI network interface with the destination address as the WAG-IP, access the original default routing of said WIFI network interface, and change the original default routing of said terminal from the setting of WIFI network interface to that of the PPP network interface, thereby forming a data packet interacting channel of the PPP link based on said WIFI link; thereby supporting to implement accessing a Packet Data Serving Node (PDSN) through a WIFI.

10. The terminal as claimed in claim 9, wherein said WIFI management module is further configured to: directly access said service server to register through a local IP address of a WIFI network interface WIFI-IP.

11. The terminal as claimed in claim 10, wherein said parameter information includes:
  an IP address of said WAG WAG-IP, and a parameter marking code Stream ID and a destination port Dest-Port during carrying out TUNNEL header encapsulation.

12. The terminal as claimed in claim 11, wherein a destination IP address in the IP header of said third data packet is said IP address of said WAG WAG-IP.

13. The terminal as claimed in claim 9, wherein
said PPP module is further configured to: carry out PPP encapsulation on a first IP data packet which will be used for service interaction to generate a second IP data packet encapsulating the PPP header, and send said second IP data packet to said first virtual terminal equipment of a pair of virtual terminal equipment;
said TUNNEL module is further configured to: start said second virtual terminal equipment of said a pair of virtual terminal equipment, read said second IP data packet, and according to said parameter information, further encapsulate said second IP data packet with one layer of TUNNEL header to generate a third IP data packet;
said IP protocol stack is further configured to: encapsulate service data of an upper layer application APP to generate the first IP data packet which will be used for service interaction, and encapsulate said third IP data packet with an outer IP header.

14. A system for accessing a Packet Data Serving Node (PDSN), said system comprising a terminal, a Wireless Access Gateway (WAG) and a Packet Data Serving Node (PDSN); wherein,
said terminal comprises:
  a Wireless Fidelity (WIFI) management module, which is configured to:
    directly access a service server to register through a WIFI module, and save parameter information returned from said service server after registering successfully; and
    set up first virtual terminal equipment and second virtual terminal equipment in a drive layer, wherein said first virtual terminal equipment and said second virtual terminal equipment are used for maintaining a receiving and sending queue;
  a Point-to-Point Protocol (PPP) module, which is configured to: encapsulate a request packet with a PPP header to generate a first data packet wherein said request packet contains information for establishing a PPP link with the PDSN, and send said first data packet to said first virtual terminal equipment;
  a TUNNEL module, which is configured to: read said first data packet from said second virtual terminal equipment, and according to said parameter information, further encapsulate said first data packet with one layer of TUNNEL header to generate a second data packet; and an Internet Protocol (IP) protocol stack, which is configured to: further encapsulate said second data packet with one layer of IP header based on a WIFI link to generate a third data packet, and send said third data packet to the WAG through said WIFI module;

said WAG is configured to: receive said third data packet, analyze and drop the IP header and TUNNEL header to recover the first data packet, and carry out Generic Routing Encapsulation (GRE) on a recovered first data packet, and forward said recovered first data packet to said PDSN;

said PDSN is configured to: after carrying out analysis processing on said recovered first data packet, establish a link connection with said terminal;

a network setup module, which is configured to: generate a new PPP network interface, and obtain a local IP address Local-IP allocated by said PDSN, and set a routing for the WIFI network interface with the destination address as the WAG-IP, access the original default routing of said WIFI network interface, and change the original default routing of said terminal from the setting of WIFI network interface to that of the PPP network interface, thereby forming a data packet interacting channel of the PPP link based on said WIFI link; thereby supporting to implement accessing the PDSN through a WIFI.

15. he system as claimed in claim 14, wherein
said WIFI management module is further configured to: directly access said service server to register through a local IP address of a WIFI network interface WIFI-IP.

16. The system as claimed in claim 15, wherein said parameter information includes:

an IP address of said WAG WAG-IP, and a parameter marking code Stream ID and a destination port Dest-Port during carrying out TUNNEL header encapsulation.

17. The system as claimed in claim 16, wherein a destination IP address in the IP header of said third data packet is said IP address of said WAG WAG-IP.

18. The system as claimed in claim 14, wherein
said PPP module is further configured to: carry out PPP encapsulation on a first IP data packet which will be used for service interaction to generate a second IP data packet encapsulating the PPP header, and send said second IP data packet to said first virtual terminal equipment of a pair of virtual terminal equipment;

said TUNNEL module is further configured to: start said second virtual terminal equipment of said a pair of virtual terminal equipment, read said second IP data packet, and according to said parameter information, further encapsulate said second IP data packet with one layer of TUNNEL header to generate a third IP data packet;

said IP protocol stack is further configured to: encapsulate service data of an upper layer application APP to generate the first IP data packet which will be used for service interaction, and encapsulate said third IP data packet with an outer IP header;

said WAG is further configured to: receive said third IP data packet, analyze and drop said TUNNEL header and outer IP header of said third IP data packet to recover said second IP data packet, and after further carrying out Generic Routing Encapsulation (GRE) on a recovered second IP data packet, forward said recovered second IP data packet to said PDSN;

said PDSN is further configured to carry out the analysis processing on said recovered second IP data packet, and forward the first IP data packet which will be used for interaction to the destination address.

* * * * *